United States Patent [19]
Houlihan et al.

[11] 3,755,330
[45] Aug. 28, 1973

[54] 1-α-HYDROXYBENZYL 3-METHYL, 1,2,3,4-TETRAHYDROISO QUINOLINO-2-CARBONITRILES

[75] Inventors: William J. Houlihan; Robert E. Manning, both of Mountain Lakes, N.J.

[73] Assignee: Sandoz-Wander, Inc., Hanover, N.J.

[22] Filed: Aug. 16, 1971

[21] Appl. No.: 172,285

Related U.S. Application Data

[60] Division of Ser. No. 51,403, May 27, 1970, Pat. No. 3,637,709, which is a continuation-in-part of Ser. No. 663,218, Aug. 25, 1967, Pat. No. 3,565,900.

[52] U.S. Cl. ........................ 260/283 CN, 260/289 R
[51] Int. Cl. ............................................. C07d 35/40
[58] Field of Search ................. 260/283 CN, 289 R, 260/286 R

[56] References Cited
UNITED STATES PATENTS

| | | | |
|---|---|---|---|
| 2,951,013 | 8/1960 | Dengel | 260/286 R |
| 3,131,191 | 4/1964 | Douglas | 260/286 R |
| 3,272,707 | 9/1966 | Tedeschi | 260/289 R |
| 3,426,027 | 2/1969 | Muller | 260/289 R |
| 3,557,122 | 1/1971 | Shavel | 260/289 R |
| 3,517,015 | 6/1970 | Ott | 260/283 CN |

FOREIGN PATENTS OR APPLICATIONS

| | | | |
|---|---|---|---|
| 694,187 | 7/1953 | Great Britain | 260/289 R |

OTHER PUBLICATIONS

Govindachari et al., Indian Acad. Sci., Vol. 42A, p. 261–266 (1955).

*Primary Examiner*—Donald G. Daus
*Attorney*—Walter F. Jewell et al.

[57] ABSTRACT

Compounds are of the class of 1-aryl-3-amino-1,5,6,10b-tetrahydro-3H-oxazolo[4,3-a]isoquinolines, useful as central nervous system stimulants.

4 Claims, No Drawings

1-α-HYDROXYBENZYL 3-METHYL, 1,2,3,4-TETRAHYDROISO QUINOLINO-2-CARBONITRILES

This application is a division of Ser. No. 51,403 filed May 27, 1970, now U.S. Pat. No. 3,637,709 which in turn is a continuation-in-part of application Ser. No. 663,218 filed Aug. 25, 1967, and now U.S. Pat. No. 3,565,900.

This invention relates to tricyclic compounds. In particular, the invention pertains to 1-aryl-3-imino-1,5,6,10b-tetrahydro-3H-oxazolo[4,3-a]isoquinolines, acid addition salts thereof, and to processes for preparing the same. The invention also relates to intermediates which are useful in preparing the above compounds and to processes for preparing said intermediates.

The oxazolo[4,3-a]isoquinolines of the present invention may be represented structurally as follows:

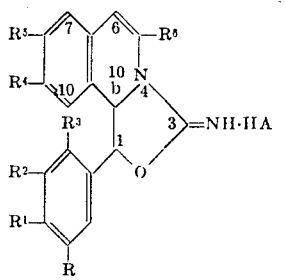

(L)

wherein
R, $R^1$, $R^2$ and $R^3$, independently, represent hydrogen, trifluoromethyl, or halo having an atomic weight of about 19–36;
$R^4$ and $R^5$, independently, represent hydrogen, straight chain lower alkyl, or halo having an atomic weight of about 19–36; and
$R^6$ represents hydrogen or straight chain lower alkyl, provided
1. no more than three of R, $R^1$, $R^2$, $R^3$, $R^4$ and $R^5$ are other than hydrogen, and
2. R, $R^1$, $R^2$ and $R^3$ are such that there is never a trifluoromethyl group on each of two adjacent carbon atoms, and A is a monovalent anion.

This invention also includes within its scope the free base of the compounds of formula (I) where $R^6$ is hydrogen.

The term lower alkyl signifies an alkyl group having 1–4 carbon atoms, viz., methyl, ethyl, propyl and butyl.

The compounds of formula (I) wherein R through $R^5$ are halo as defined above represent a preferred aspect of this invention. Particularly preferred are those compounds where either R or R and $R^1$ represent chloro.

The compounds of formula (I) are conveniently prepared by reacting an appropriate α-aryl-1,2,3,4-tetrahydroisoquinoline-1-methanol (III) with cyanogen bromide. Alternatively, the compounds may be prepared by reacting an appropriate 1-(α-hydroxybenzyl)-1,2,3,4-tetrahydroisoquinoline-2-carboxamide (II) with thionyl chloride. These processes are illustrated by the following reaction scheme:

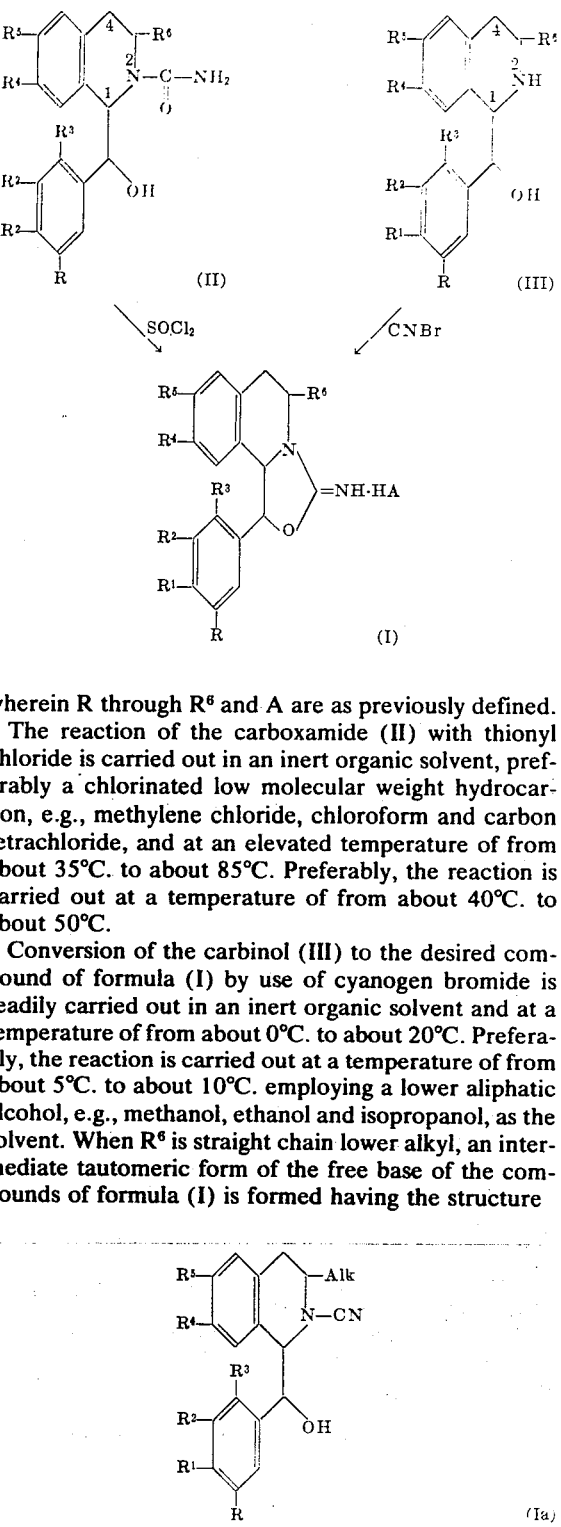

wherein R through $R^6$ and A are as previously defined.

The reaction of the carboxamide (II) with thionyl chloride is carried out in an inert organic solvent, preferably a chlorinated low molecular weight hydrocarbon, e.g., methylene chloride, chloroform and carbon tetrachloride, and at an elevated temperature of from about 35°C. to about 85°C. Preferably, the reaction is carried out at a temperature of from about 40°C. to about 50°C.

Conversion of the carbinol (III) to the desired compound of formula (I) by use of cyanogen bromide is readily carried out in an inert organic solvent and at a temperature of from about 0°C. to about 20°C. Preferably, the reaction is carried out at a temperature of from about 5°C. to about 10°C. employing a lower aliphatic alcohol, e.g., methanol, ethanol and isopropanol, as the solvent. When $R^6$ is straight chain lower alkyl, an intermediate tautomeric form of the free base of the compounds of formula (I) is formed having the structure

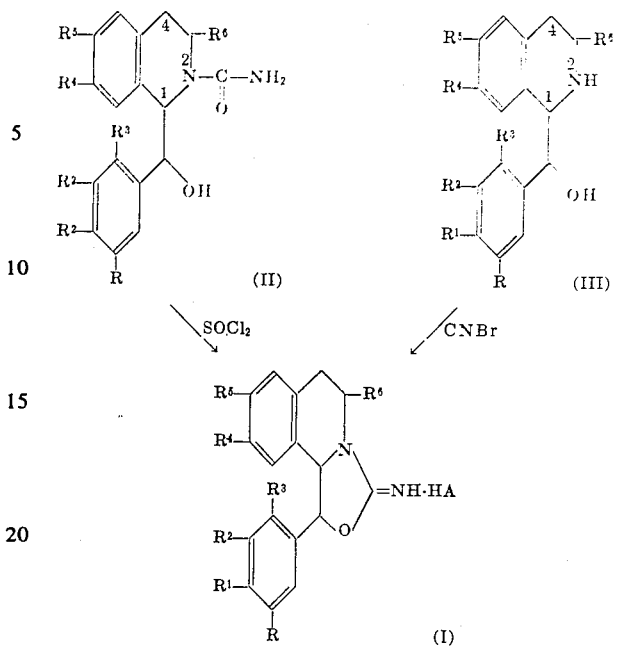

(Ia)

where R–$R^5$ are as previously defined, and such compounds are readily converted to the compounds of formula (I) where $R^6$ is straight chain lower alkyl by treatment with acid, e.g., hydrochloric and hydrobromic acid, or sulphuric, phosphoric acid, and the like, conveniently at a temperature of from about 0°C. to about 40°C., preferably about room temperature. Use of solvent is not necessary.

In each of the above processes, the product obtained is readily isolated employing conventional techniques.

The free base of the compounds of formula (I) are believed to exist essentially only when $R^6$ is hydrogen, and such compounds may be obtained by treating compounds (I) with a base in conventional manner.

The compounds of formula (II) are readily obtained from the corresponding compounds of formula (III) by treatment of the latter, under acidic conditions, with an alkali-metal isocyanate, preferably potassium isocyanate, in an inert organic solvent, preferably a lower aliphatic alcohol, e.g., methanol, ethanol and isopropanol. The reaction is preferably carried out in the presence of a mineral acid, e.g., hydrochloric acid, sulphuric acid and phosphoric acid, and at a temperature of from about 20°C. to about 25°C. However, the reaction can be effected at a temperature of from about 0°C. to about 35°C. and in the presence of any suitable inert inorganic or organic acid which is capable of liberating cyanic acid, e.g., p-toluenesulfonic acid and acetic acid.

Various of the compounds of formula (III) are known and can be prepared as described in the literature. Such others which may not be specifically disclosed in the literature may be prepared from available materials in a manner analogous to that described in the literature for preparing the known compounds. In general, such compounds are prepared by reacting 1-cyano-2-benzoyl-1,2-dihydroisoquinoline (prepared by the procedure of J. Weinstock and V. Boekelheide in Organic Synthesis, Coll. Vol. 2, p. 641) with an appropriate lithium compound to form the corresponding 1-lithio derivative, treating the latter with benzaldehyde (or appropriate derivative thereof) to form the corresponding α-aryl-isoquinoline-1-methanol and catalytically hydrogenating the latter, e.g., in acetic acid in the presence of a platinum catalyst and at a temperature of from 25° to 45°C. and a hydrogen pressure of 1 to 5 atmospheres.

The compounds of formula (III) are alternatively prepared from N-(substitutedphenethyl)-2-phenyl acetamides (V) according to the following reaction scheme

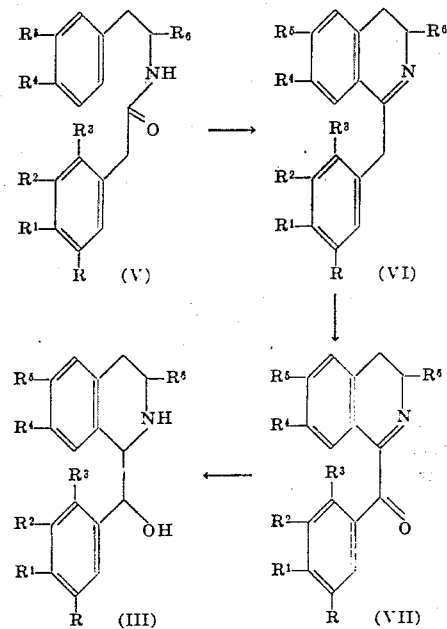

where R–$R^6$ are as earlier defined. These carbinol intermediates (III) are prepared by cyclizing said acetamides (V) with phosphorous pentoxide in solvent such as benzene or xylene at about 75° to 150°C to obtain a corresponding 1-benzyl dihydroisoquinoline (VI), treating said dihydroisoquinoline with air or oxygen, conveniently at room temperature, to obtain a corresponding 1-benzoyl dihydroisoquinoline (VII) and reducing this compound (VII) at a temperature of 20° to 50°C in solvent, e.g., ethanol, with hydrogen in the presence of platinum as catalyst. Certain of the acetamide starting materials (V) are known and are prepared according to methods disclosed in the literature. Those acetamides not specifically disclosed may be prepared by analogous methods from known materials.

The compounds of formula (I) exist as geometric isomers. Each of the above-described processes for preparing (I) results in the production of compounds of a particular geometric isomer configuration. For the purpose of this invention, the compounds (I) obtained via the reaction of the carbinols (III) where $R^6$ is hydrogen with cyanogen bromide are designated as "Isomer A" while the compounds resulting from the reaction of a carboxamide (II) where $R^6$ is hydrogen with thionyl chloride are designated as "Isomer B." Likewise, reaction of the carbinols defined by formula (III) where $R^6$ is lower alkyl with cyanogen bromide provides compounds (I) referred to herein as "Isomer C" whereas the compounds resulting from the reaction of thionyl chloride with a carboxamide (II) where $R^6$ is lower alkyl may be designated as "Isomer D." The compounds of formula (I) in all geometric isomer forms also exist as optical isomers, and the separation and recovery of the respective isomers may be readily accomplished employing conventional techniques. All of the isomers (geometric and optical) are included within the scope of this invention.

All of the compounds of formula (I) are useful because they possess pharmacological activities in animals. In particular, the compounds possess central nervous system activity and can be used as antidepressants as indicated by their activity in the mouse given 10 mg/kg intraperitoneally of the active compound and tested for its ability to reverse reserpine hypothermia (Spencer, P.S.J., Antagonism of Hypothermia in the Mouse by Antidepressants, in Antidepressant Drugs, p. 194–204, Eds., S. Garattini and M.N.G. Dukes, Excerpta Medica Foundation, 1967).

Compounds (I) and particularly those defined as "Isomer B" are also useful as anorexics as indicated by their activity in rats orally given 25 mg/kg of active compound and tested using the free feeding method described by Randall, et al. (J.P.E.T., 129:163, 1960).

For such uses, the compounds may be combined with a pharmaceutically acceptable carrier, and such other conventional adjuvants, as may be necessary, and administered orally in such forms as tablets, capsules, elixirs, suspensions or solutions, or parenterally in such forms as injectable solutions, suspensions or emulsions. The compounds may be administered in the form of their non-toxic, pharmaceutically acceptable acid addition salts or in free base form when $R^6$ is hydrogen. The salts possess the same order of activity as said free base. The free base form of the compounds of formula (I), whether it exists as an oxazolo[4,3-a]isoquinoline or as a carbonitrile (Ia), is readily prepared from the salts (I) using conventional techniques. The pharmaceutically acceptable salts are likewise readily prepared in conventional manner by reacting the base of the compounds of formula (I) or the tautomeric intermediate (Ia) with the appropriate acid. Representative of such salts are the mineral acid salts such as the hydrochloride, hydrobromide, sulfate, phosphate and the like and the organic acid salts such as the succinate, benzoate, acetate, maleate, p-toluenesulfonate and the like.

The dosage administered will, of course, vary depending on the particular compound employed and mode of administration. However, in general, satisfactory results are obtained when the compounds are administered for the anti-depressant use at a daily dosage of from about 10–30 mg/kg of animal body weight, preferably given in divided doses, e.g., 2 to 4 times a day or in sustained release form. For most large mammals the total daily dosage is in the range of from about 20 mg to about 100 mg. Suitable dosage forms comprise from about 5 mg to about 50 mg admixed with a pharmaceutically acceptable carrier or diluent.

When the compounds are to be utilized as anorexics, satisfactory results are obtained when the compounds are administered at a daily dosage of from about 10 mg to about 30 mg/kg of animal body weight, preferably given in divided doses, e.g., 2 to 4 times a day or in sustained release form. For most large mammals the total daily dosage for this use is from about 20 mg to about 100 mg and suitable dosage forms comprise from about 5 mg to about 50 mg admixed with a pharmaceutically acceptable carrier or diluent.

A representative formulation suitable for oral administration is a tablet prepared by standard tabletting techniques and containing the following:

| Ingredient | Parts by Weight |
|---|---|
| 1-(p-chlorophenyl)-3-imino-1,5,6,10b-tetrahydro-3H-oxazolo[4,3-a]isoquinoline hydrochloride(Isomer A or B) | 25 |
| tragacanth | 2 |
| lactose | 64.5 |
| corn starch | 5 |
| talcum | 3 |
| magnesium stearate | 0.5 |

The following examples show representative compounds contemplated by this invention and the manner in which such compounds are prepared. However, it is to be understood that these examples are intended for purposes of illustration only and are not intended as in any way limiting the scope of the invention which is defined in the appended claims.

EXAMPLE 1

1-(p-Chlorophenyl)-3-imino-1,5,6,10b-tetrahydro-3H-oxazolo[4,3-a]isoquinoline

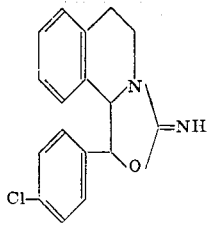

Step A. Preparation of α-(p-chlorophenyl)-isoquinoline-1-methanol

To a flask equipped with a thermometer, condenser, dropping funnel, gas inlet tube and stirrer is added 500 ml. of absolute tetrahydrofuran and 26.0 g. (0.10 mole) of 1-cyano-2-benzoyl-1,2-dihydroisoquinoline. The system is blanketed with nitrogen and the solution cooled in an ice-salt-methanol bath to an internal temperature of −15°C. To the cooled solution is then added, dropwise over a period of 15 minutes, 50 ml. of a 2 M solution of phenyllithium in tetrahydrofuran. To the resulting solution is added, with stirring, a solution of 14.1 g. (0.10 mole) of p-chlorobenzaldehyde in 75 ml. of tetrahydrofuran at such a rate that the internal temperature does not exceed −10°C. After the addition is completed the solution is stirred for an additional hour at −10°C. and then allowed to stand at room temperature (20°–25°C.) for 12 hours. To the solution is then added 500 ml. of tetrahydrofuran and the resulting solution extracted first with 30 ml. of water, then with 30 ml. of 0.5 N hydrochloric acid and then again with 30 ml. of water. The tetrahydrofuran is then removed in vacuo and the residue [benzoate salt of α-(p-chlorophenyl)-isoquinoline-1-methanol] dissolved in 500 ml. of 95 percent ethanol. To the resulting solution is added 16.2 g. (0.29 mole) of potassium hydroxide in 125 ml. of water. The resulting mixture is refluxed for 16 hours and then concentrated in vacuo. To the residue is added 100 ml. of water and the resulting solution extracted with 200 ml. of toluene. The toluene extract is dried over anhydrous magnesium sulfate and the toluene then removed in vacuo to obtain α-(p-chlorophenyl)-isoquinoline-1-methanol, m.p. 98°–103°C.

When the above procedure designated Step A is carried out and m-trifluoromethyl benzaldehyde, p-fluorobenzaldehyde or 3,4-dichlorobenzaldehyde is used in place of p-chlorobenzaldehyde, there is obtained α-(m-trifluoromethylphenyl)-isoquinoline-1-methanol (m.p. 97°–99°C), α-(p-fluorophenyl)-isoquinoline-1-methanol (m.p. 85°–87°C), or α-(3,4-dichlorophenyl)-isoquinoline-1-methanol (m.p. 114°–116°C), respectively.

Step B. Preparation of α-(p-chlorophenyl)-1,2,3,4-tetrahydroisoquinoline-1-methanol A mixture of 14.0 g. (0.052 mole) of α-(p-chlorophenyl)-isoquinoline-1-methanol, 100 ml. of acetic acid and 0.5 g. of platinum dioxide (in a Paar hydrogenation bottle) is hydrogenated at 45 p.s.i. and room temperature until the hydrogen uptake is complete (3 equivalents hydrogen; 3 hours). The catalyst is then filtered off and the filtrate concentrated in vacuo. To the resulting oily residue is added 75 ml. of 2N sodium hydroxide and the resulting mixture extracted with 150 ml. of chloroform. The chloroform extract is dried over anhydrous magnesium sulfate and then concentrated in vacuo. The resulting residue is crystallized from pentane to obtain α-(p-chlorophenyl)-1,2,3,4-tetrahydroisoquinoline-1-methanol, m.p, 97°–101°C.

When the procedure of Step B is used and α-(m-trifluoromethylphenyl)-isoquinoline-1-methanol, α-(p-fluorophenyl)-isoquinoline-1-methanol, or α-(3,4-dichlorophenyl)-isoquinoline-1-methanol is used in place of α-(p-chlorophenyl)-isoquinoline-1-methanol, there is obtained α-(m-trifluoromethylphenyl)-1,2,3,4-tetrahydroisoquinoline-1-methanol (m.p. 97.5°–99.5°), α-(p-fluorophenyl)-1,2,3,4-tetrahydroisoquinoline-1-methanol (m.p. 73°–78°C), or α-(3,4-dichlorophenyl)-1,2,3,4-tetrahydroisoquinoline-1-methanol (m.p. 89°–99°C), respectively.

Step C. Preparation of 1-(p-chlorophenyl)-3-imino-1,5,6,10b-tetrahydro-3H-oxazolo[4,3-a]isoquinoline A solution of 7.3 g. (0.027 mole) of α-(p-chlorophenyl)-1,2,3,4-tetrahydroisoquinoline-1-methanol, 4.4 g. (0.0534 mole) of sodium acetate and 125 ml. of methanol is cooled to about 5°C. To the cooled solution is added, dropwise, a solution of 2.8 g. (0.0267 mole) of cyanogen bromide in 15 ml. of methanol. After stirring for 12 hours at room temperature (20°–25°C.) the solvent is evaporated and the residue dissolved in water. To the resulting solution is added 2N sodium hydroxide until basic (pH 10). The resulting oil is extracted with 75 ml. of methylene chloride, the methylene chloride extract dried over anhydrous magnesium sulfate and then concentrated in vacuo to obtain 1-(p-chlorophenyl)-3-imino-1,5,6,10b-tetrahydro-3H-oxazolo[4,3-a]isoquinoline as an oil (Isomer A).

The oily base is dissolved in tetrahydrofuran, the resulting solution treated with hydrogen chloride gas and precipitated salt recovered by filtration to obtain 1-(p-chlorophenyl)-3-imino-1,5,6,10b-tetrahydro-3H-oxazolo[4,3-a]isoquinoline hydrochloride, m.p. 160°–168°C. (Isomer A). When the above oily base dissolved in tetrahydrofuran is treated with maleic acid, there is obtained 1-(p-chlorophenyl)-3-imino-1,5,6,10b-tetrahydro-3H-oxazolo[4,3-a]isoquinoline maleate; m.p. 168°–169°C (Isomer A).

When the above procedure designated Step C is repeated and α-(m-trifluoromethylphenyl)-1,2,3,4-tetrahydroisoquinoline-1-methanol, α-(p-fluorophenyl)-1,2,3,4-tetrahydroisoquinoline-1-methanol, or α-(3,4-dichlorophenyl)-1,2,3,4-tetrahydroisoquinoline-1-methanol is used in place of α-(p-chlorophenyl)-1,2,3,4-tetrahydroisoquinoline-1-methanol, there is obtained 1-(m-trifluoromethylphenyl)-3-imino-1,5,6,10b-tetrahydro-3H-oxazolo[4,3-a]isoquinoline hydrochloride (m.p. 1-86°–190°C.) (Isomer A), 1-(p-fluorophenyl)-3-imino-1,5,6,10b-tetrahydro-3H-oxazolo[4,3-a]isoquinoline hydrochloride (m.p. 227°–230°C.) (Isomer A), or 1-(3,4-dichlorophenyl)-3-imino-1,5,6,10b-tetrahydro-3H-oxazolo[4,3-a]isoquinoline hydrochloride (m.p. 1-68°–170°C.) (Isomer A), respectively.

Likewise, when the above procedure designated Step C is used and 7-methyl-α-phenyl-1,2,3,4-tetrahydroisoquinoline-1-methanol, 7-chloro-α-phenyl-1,2,3,4-tetrahydroisoquinoline-1-methanol, or 7-fluoro-α-phenyl-1,2,3,4-tetrahydroisoquinoline-1-methanol is used in place of α-(p-chlorophenyl)-1,2,3,4-tetrahydroisoquinoline-1-methanol, there is obtained 1-phenyl-3-imino-9-methyl-1,5,6,10b-tetrahydro-3H-oxazolo[4,3-a]isoquinoline hydrochloride (m.p. 267°–269°C.) (Isomer A), 1-phenyl-3-imino-9-chloro-1,5,6,10b-tetrahydro-3H-oxazolo[4,3-a]isoquinoline hydrochloride (m.p. 261°–262°C.) (Isomer A), or 1-phenyl-3-imino-9-fluoro-1,5,6,10b-tetrahydro-3H-oxazolo[4,3-a]isoquinoline hydrochloride (m.p. 258°–259°C.) (Isomer A), respectively.

EXAMPLE 2

1-(p-Chlorophenyl)-3-imino-1,5,6,10b-tetrahydro-3H-oxazolo[4,3-a]isoquinoline hydrochloride (Alternate process)

Step A. Preparation of 1-(p-chloro-α-hydroxybenzyl)-1,2,3,4-tetrahydroisoquinoline-2-carboxamide To a solution of 5.6 g. of α-(p-chlorophenyl)-1,2,3,4-tetrahydroisoquinoline-1-methanol in 12 ml. of methanol and 3.5 ml. of concentrated hydrochloric acid is added a solution of 1.8 g. of potassium isocyanate in 4 ml. of water. The resulting mixture is stirred overnight (16 hours) at room temperature (20°–25°C.) and the resulting solid mass diluted with 10 ml. of methanol and 10 ml. of water and then recovered by filtration to obtain 1-(p-chloro-α-hydroxybenzyl)-1,2,3,4-tetrahydroisoquinoline-2-carboxamide, m.p. 67°–69°C.

Step B. Preparation of 1-(p-chlorophenyl)-3-imino-1,5,6,10b-tetrahydro-3H-oxazolo[4,3-a]isoquinoline hydrochloride To a cooled solution (ice bath) of 12.5 g. of 1-(p-chloro-α-hydroxybenzyl)-1,2,3,4-tetrahydroisoquinoline-2-carboxamide in 200 ml., of methylene chloride is added, with stirring, a solution of 5.0 g. of thionyl chloride in 40 ml. of methylene chloride. The resulting solution is refluxed for 30 minutes and then evaporated in vacuo. The residue is heated with 100 ml. of water on a steam bath for 30 minutes, then cooled and the resulting solid material recovered by filtration and crystallized from methylene chloride-acetone (1:1) to obtain 1-(p-chlorophenyl)-3-imino-1,5,6,10b-tetrahydro-3H-oxazolo[4,3-a]isoquinoline hydrochloride, m.p. 239°–240°C. (dec.) (Isomer B).

When the procedure of Steps A and B immediately above are used and α-(m-trifluoromethylphenyl)-1,2,3,4-tetrahydroisoquinoline-1-methanol, α-(p-fluorophenyl)-1,2,3,4-tetrahydroisoquinoline-1-methanol, or α-(3,4-dichlorophenyl)-1,2,3,4-tetrahydroisoquinoline-1-methanol is used in place of α-(p-chlorophenyl)-1,2,3,4-tetrahydroisoquinoline-1-methanol, there is obtained 1-(m-trifluoromethylphenyl)-3-imino-1,5,6,10b-tetrahydro-3H-oxazolo[4,3-a]isoquinoline hydrochloride (m.p. 2-44°–245°C.) (Isomer B), 1-(p-fluorophenyl)-3-imino-1,5,6,10b-tetrahydro-3H-oxazolo[4,3-a]isoquinoline hydrochloride (m.p. 209°–211°C.) (Isomer B), or 1-(3,4-dichlorophenyl)-3-imino-1,5,6,10b-tetrahydro-3H-oxazolo[4,3-a]isoquinoline hydrochloride (m.p. 2-19°–221°C.) (Isomer B), respectively.

EXAMPLE 3

1-Phenyl-3-imino-1,5,6,10b-tetrahydro-3H-oxazolo[4,3-a]isoquinoline

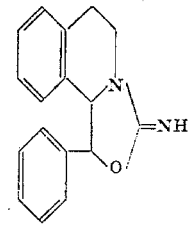

A solution of 12.5 g. (0.052 mole) of α-phenyl-1,2,3,4-tetrahydroisoquinoline-1-methanol, 8.5 g. (0.104 mole) of sodium acetate and 100 ml. of methanol is cooled to about 5°C. To the cooled solution is added, dropwise, a solution of 5.5 g. (0.052 mole) of cyanogen bromide in 25 ml. of methanol. After stirring for 12 hours at room temperature (20°–25°C.) the solvent is evaporated and the residue dissolved in water. To the resulting solution is added 2N sodium hydroxide until basic (pH 10). The resulting oil is extracted with 100 ml. of methylene chloride, the methylene chloride extract dried over anhydrous magnesium sulfate and then concentrated in vacuo to obtain 1-phenyl-3- imino-1,5,6,10b-tetrahydro-3H-oxazolo[4,3-a]isoquinoline as an oil (Isomer A).

The oily base is dissolved in tetrahydrofuran, the resulting solution treated with hydrogen chloride gas and the precipitated salt recovered by filtration to obtain 1-phenyl-3-imino-1,5,6,10b-tetrahydro-3H-oxazolo[4,3-a]isoquinoline hydrochloride, m.p. 228°–230°C. (Isomer A).

EXAMPLE 4

1-(2,4-dichlorophenyl)-3-imino-1,5,6,10b-tetrahydro-3H-oxazolo[4,3-a]isoquinoline

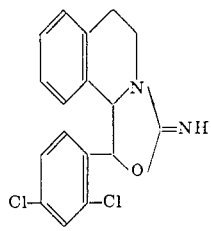

Step A. Preparation of α-(2,4-dichlorophenyl)-isoquinoline-1-methanol

To a flask equipped with a thermometer, condenser, dropping funnel, gas inlet tube and stirrer is added 650 ml. of absolute tetrahydrofuran and 65 g. (0.25 mole) of 1-cyano-2-benzoyl-1,2-dihydro-isoquinoline. The system is blanketed with nitrogen and the solution cooled in an ice-salt-methanol bath to an internal temperature of −15°C. To the cooled solution is then added, dropwise over a period of 15 minutes, 125 ml. (0.25 mole) of 2.14 molar phenyllithium in tetrahydrofuran. To the resulting solution is added, with stirring, a solution or 43.8 g. (0.25 mole) of 2,4-dichlorobenzaldehyde in 300 ml. of tetrahydrofuran at such a rate that the internal temperature does not exceed −10°C. After the addition is completed the solution is stirred for an additional hour at −10°C. and then allowed to stand at room temperature (20°–25°C.) for 12 hours. To the solution is then added 500 ml. of tetrahydrofuran and the resulting solution extracted first with 75 ml. of water, then with 75 ml. of 0.5 N hydrochloric acid and then again with 75 ml. of water. The tetrahydrofuran is then removed in vacuo and the residue dissolved in 1,000 ml. of 95 percent ethanol. To the resulting solution is added 40.5 g. (0.725 mole) of potassium hydroxide in 250 ml. of water. The resulting mixture is refluxed for 16 hours and then concentrated in vacuo. To the residue is added 250 ml. of water and the resulting solution extracted three times each with 200 ml. of toluene. The toluene extract is dried over sodium sulfate, the toluene then removed in vacuo and the residue crystallized from ether-pentane (1:1) to obtain α-(2,4-dichlorophenyl)-isoquinoline-1-methanol, m.p. 97°–100°C.

Step B. Preparation of α-(2,4-dichlorophenyl)-1,2,3,4-tetrahydroisoquinoline-1-methanol A mixture of 40.9 g. (0.135 mole) of α-(3,4-dichlorophenyl)-isoquinoline-1-methanol, 125 ml. of acetic acid and 1.0 g. of platinum dioxide (in a Paar hydrogenation bottle) is hydrogenated at 49 p.s.i. and room temperature until the hydrogen uptake is complete (4 hours). The catalyst is then filtered off and the filtrate concentrated in vacuo. To the resulting oily residue is added 100 ml. of 2N sodium hydroxide and the resulting mixture extracted with 250 ml. of chloroform. The chloroform extract is dried over anhydrous sodium sulfate and then concentrated in vacuo. The resulting residue is crystallized from pentane-ether (1:1) to obtain α-(2,4-dichlorophenyl)-1,2,3,4-tetrahydroisoquinoline-1-methanol, m.p. 132°–134°C.

Step C. Preparation of 1-(2,4-dichlorophenyl)-3-imino-1,5,6,10b-tetrahydro-3H-oxazolo[4,3-a]isoquinoline A solution of 20.0 g. (0.065 mole) of α-(2,4-dichlorophenyl)-1,2,3,4-tetrahydroisoquinoline-1-methanol, 10.7 g. (0.13 mole) of sodium acetate and 500 ml. of methanol is cooled to about 5°C. To the cooled solution is added, dropwise, a solution of 6.8 g. (0.065 mole) of cyanogen bromide in 50 ml. of methanol. After stirring for 15 hours at room temperature (20°–25°C.) the solvent is evaporated and the residue dissolved in water. To the resulting solution is added 2N sodium hydroxide until basic (pH 10). The resulting oil is extracted with 150 ml. of methylene chloride, the methylene chloride extract dried over anhydrous magnesium sulfate and then concentrated in vacuo to obtain 1-(2,4-dichlorophenyl)-3-imino-1,5,6,10b-tetrahydro-3H-oxazolo[4,3-a]isoquinoline as an oil (Isomer A).

The oily base is dissolved in tetrahydrofuran, the resulting solution treated with hydrogen chloride gas and precipitated salt recovered by filtration to obtain 1-(2,4-dichlorophenyl)-3-imino-1,5,6,10b-tetrahydro-3H-oxazolo[4,3-a]isoquinoline hydrochloride, m.p. 170°–176°C. (Isomer A).

EXAMPLE 5

1-(2,4-dichlorophenyl)-3-imino-1,5,6,10b-tetrahydro-3H-oxazolo[4,3-a]isoquinoline hydrochloride
(Alternate process)

Step A. Preparation of 1-(2,4-dichloro-α-hydroxybenzyl)-1,2,3,4-tetrahydroisoquinoline-2-carboxamide To a solution of 7.2 g. (0.021 mole) of α-(2,4-dichlorophenyl)-1,2,3,4-tetrahydroisoquinoline-1-methanol in 50 ml. of methanol, 200 ml. of water, and 2.2 ml. of concentrated hydrochloric acid is added a solution of 2.0 g. of potassium isocyanate in 10 ml. of water. The resulting mixture is stirred for 48 hours at room temperature (20°–25°C.) and the resulting solid mass recovered by filtration to obtain 1-(2,4-dichloro-α-hydroxybenzyl)-1,2,3,4-tetrahydroisoquinoline-2-carboxamide.

Step B. Preparation of 1-(2,4-dichlorophenyl)-3-imino-1,5,6,10b-tetrahydro-3H-oxazolo[4,3-a]isoquinoline hydrochloride To a cooled solution (ice bath) of 6.2 g. (0.018 mole) of 1-(2,4-dichloro-α-hydroxybenzyl)-1,2,3,4-tetrahydroisoquinoline-2-carboxamide in 150 ml. of methylene chloride is added, with stirring, a solution of 2.2 g. of thionyl chloride in 10 ml. of methylene chloride. The resulting solution is refluxed for 30 minutes and then evaporated in vacuo. The residue is heated with 50 ml. of water on a steam bath for 30 minutes, then cooled and the resulting solid material recovered to obtain 1-(2,4-dichlorophenyl)-3-imino-1,5,6,10b-tetrahydro-3H-oxazolo[4,3-a]isoquinoline hydrochloride, m.p. 196°–199°C. (Isomer B).

EXAMPLE 6

1-phenyl-3-imino-5-methyl-1,5,6,10b-tetrahydro-3H-oxazolo[4,3-a]isoquinoline hydrochloride

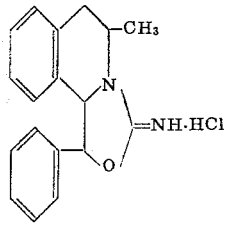

Step A. 2-benzoyl-1,2-dihydro-3-methylisoquinoline-1-carbonitrile

In a 3-liter four-neck flask, equipped with mechanical stirrer, dropping funnel, thermometer and condenser are placed a solution of 196 g. of potassium cyanide in 1,250 ml. of water and 143 g. of 3-methylisoquinoline. While the temperature was maintained between 5 and 10 by use of an ice bath, 281 g. of benzoylchloride is added dropwise for 2 hours. After another 1.5 hours, the resulting material crystalizes and is filtered off, washed with water (200 ml), 2N HCl solution (300 ml) and water (300 ml). The crude material (330 g.) is recrystallized from ethanol three times to afford 2-benzoyl-1,2-dihydro-3-methylisoquinoline-1-carbonitrile; m.p. 137°-138°C.

Step B. α-phenyl-3-methyl-1,2,3,4-tetrahydroisoquinoline-1-methanol hydrochloride 2-benzoyl-1,2-dihydro-3-methylisoquinoline (27.4 g.) is dissolved in 500 ml. of absolute tetrahydrofuran in a 2-liter four-neck flask equipped with thermometer, dropping funnel, condenser with nitrogen inlet and mechanical stirrer. The internal temperature is maintained between −20°C. and −10°C. A 2 molar solution (50 ml) of phenyllithium in benzene/ether (70:30) is added dropwise. To the resultant red solution, 10.6 g. of benzaldehyde in 75 ml. absolute tetrahydrofuran is added dropwise over a 20 minute period. The mixture is stirred for 1 hour at −10°C, then at room temperature overnight. After work up 38 g. of an oil is obtained which is hydrolized in 100 ml. of 2N potassium hydroxide and 500 ml. of ethanol by refluxing overnight. The mixture is concentrated in vacuo to about 200 ml. and worked up to provide 28 g. of an oil which is hydrogenated without further purification in 90 ml. of glacial acetic acid in the presence of 250 mg. of platinum dioxide. After the absorption of hydrogen has stopped, the catalyst is removed by filtration and the solution is evaporated in vacuo. Ether (100 ml) is added and the product is precipitated as hydrochloride by adding 100 ml. of 2N HCl solution. Crude product (16.2 g.) is filtered off and recrystallized from ethanol/ether to yield 13.8 g. of α-phenyl-3-methyl-1,2,3,4-tetrahydroisoquinoline-1-methanol hydrochloride; m.p. 198°-199°C.

When the procedure of Steps A and B above are repeated and p-chlorobenzoylchloride or 3,4-dichlorobenzoylchloride is used in place of benzoylchloride, there is obtained α-(p-chlorophenyl)-3-methyl-1,2,3,4-tetrahydroisoquinoline-1-methanol hydrochloride; (m.p. 213°C), or α-(3,4-dichlorophenyl)-3-methyl-1,2,3,4-tetrahydroisoquinoline-1-methanol hydrochloride;(m.p. 230°-233°C), respectively.

Step C. 1-(α-hydroxybenzyl)-3-methyl-1,2,3,4-tetrahydroisoquinoline-2-carbonitrile α-phenyl-3-methyl-1,2,3,4-tetrahydroisoquinoline-1-methanol HCl (4.5 g.) is dissolved in 100 ml. of warm water. 10 ml. of 2N sodium hydroxide solution and methylenechloride are added and work up yields 3.2 g. of α-phenyl-3-methyl-1,2,3,4-tetrahydroisoquinoline-1-methanol; m.p. 96°-98°C. To 2.53 g. of the above free base dissolved in 70 ml. of absolute methanol is added 1 g. of anhydrous sodium acetate. To this ice cold solution is added, dropwise, 1.1 g. of cyanogen bromide in 30 ml. of absolute methanol. After 2 hours at room temperature, methanol is evaporated in vacuo. Extraction with methylene chloride affords 3.8 g. of crude product; m.p. 141°C. After recrystallization from methylene chloride/hexane 2.5 g. of pure 1-(α-hydroxybenzyl)-3-methyl-1,2,3,4-tetrahydroisoquinoline-2-carbonitrile is obtained; (m.p. 144°-145°C).

When the above process is carried out and α-(p-chlorophenyl)-3-methyl-1,2,3,4-tetrahydroisoquinoline-1-methanol or α-(3,4-dichlorophenyl)-3-methyl-1,2,3,4-tetrahydroisoquinoline-1-methanol is used in place of α-phenyl-3-methyl-1,2,3,4-tetrahydroisoquinoline-1-methanol, there is obtained 1-(p-chloro-α-hydroxybenzyl)-3-methyl-1,2,3,4-tetrahydroisoquinoline-2-carbonitrile (m.p. 151°C) or 1-(3,4-dichloro-α-hydroxybenzyl)-3-methyl-1,2,3,4-tetrahydroisoquinoline-2-carbonitrile (m.p. 147°-149°C), respectively.

Step D. 1-phenyl-3-imino-5-methyl-1,5,6,10b-tetrahydro-3H-oxazolo[4,3-a]isoquinoline hydrochloride.

1-(α-hydroxybenzyl)-3-methyl-1,2,3,4-tetrahydroisoquinoline-2-carbonitrile (1.5 g.) is cyclized at 25°C. with 10 ml. of N HCl in ethanol. The hydrochloride precipitates and is filtered to provide 1.8 g. of crude material; m.p. 252°C. Two recrystallizations from ethanol/ether (1:1) provides 1-phenyl-3-imino-5-methyl-1,5,6,10b-tetrahydro-3H-oxazolo[4,3-a]isoquinoline hydrochloride; m.p. 267°-268°C.

When the process of Step D is repeated and 1-(p-chloro-α-hydroxybenzyl)-3-methyl-1,2,3,4-tetrahydroisoquinoline-2-carbonitrile or 1-(3,4-dichloro-α-hydroxybenzyl)-3-methyl-1,2,3,4-tetrahydroiso-quinoline-2-carbonitrile is used in place of 1-(α-hydroxybenzyl)-3-methyl-1,2,3,4-tetrahydroisoquinoline-2-carbonitrile, and when in the case of the p-chloro compound HBr is used in place of HCl, there is obtained 1-p-chlorophenyl-3-imino-5-methyl-1,5,6,10b-tetrahydro-3H-oxazolo[4,3-a]isoquinoline hydrobromide (m.p. 237°-238°C) or 1-(3,4-dichlorophenyl)-3-imino-5-methyl-1,5,6,10b-tetrahydro-3H-oxazolo [4,3-a]isoquinoline hydrochloride (m.p. 246°-247°C), respectively.

EXAMPLE 7

7-chloro-α-phenyl-1,2,3,4-tetrahydroisoquinoline-1-methanol

Step A. 1-benzyl-7-chloro-3,4-dihydroisoquinoline

N-(p-chlorophenethyl)-2-phenyl acetamide (57 g.) is refluxed overnight in 500 ml. of xylene in the presence of 120 g. of phosphorous pentoxide and 80 g. of pumice. The xylene layer is decanted and the residue dissolved in water, ice and concentrated HCl. The pumice is filtered off and the aqueous solution extracted with dichloromethane. The organic phase is discarded and the aqueous part is made basic (pH 10) with 50% NaOH and extracted 3 times with dichloromethane. The solvent is evaporated providing 23 g. of crude 1-benzyl-7-chloro-3,4-dihydroisoquinoline.

Step B. 1-benzoyl-7-chloro-3,4-dihydroisoquinoline

A solution of 1-benzyl-7-chloro-3,4-dihydroisoquinoline (22 g.) in 500 ml. of benzene is treated by bubbling air through the solution, and evaporating it to dryness, to obtain 6.2 g. of brown oil. After purification on silica gel, 550 mg. of crystalline 1-benzoyl-7-chloro-3,4-dihydroisoquinoline is obtained (m.p. 98°–99°C).

Step C. 7-chloro-α-phenyl-1,2,3,4-tetrahydroisoquinoline-1-methanol

1-Benzoyl-7-chloro-3,4-dihydroisoquinoline (2.0 g) dissolved in 50 ml. of absolute ethanol is hydrogenated at about 40 p.s.i. in the presence of 500 mg. of platinum dioxide. After one-half hour, hydrogen absorption ceases, the catalyst is filtered off, and the solvent is evaporated, leaving 1.3 g. of crude 7-chloro-α-phenyl-1,2,3,4-tetrahydro-isoquinoline-1-methanol as an oil.

When Steps A, B and C immediately above are repeated using N-(p-methylphenethyl)-2-phenyl acetamide or N-(p-fluorophenethyl)-2-phenyl acetamide in place of N-(p-chlorophenethyl)-2-phenyl acetamide, there is obtained 7-methyl-α-phenyl-1,2,3,4-tetrahydroisoquinoline-1-methanol (m.p. 101.1°-2°C) or 7-fluoro-α-phenyl-1,2,3,4-tetrahydroisoquinoline-1-methanol, respectively.

What is claimed is:

1. A compound of the formula

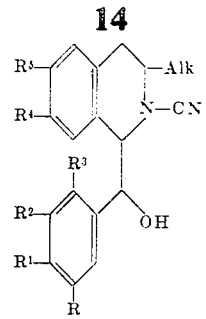

where
R, $R^1$, $R^2$ and $R^3$, independently, represent hydrogen, trifluoromethyl, or halo having an atomic weight of about 19–36;
$R^4$ and $R^5$, independently, represent hydrogen, straight chain lower alkyl, or halo having an atomic weight of about 19-36; and
Alk represents straight chain lower alkyl,
provided
1. no more than three of R, $R^1$, $R^2$, $R^3$, $R^4$ and $R^5$ are other than hydrogen, and
2. R, $R^1$, $R^2$ and $R^3$ are such that there is never a trifluoromethyl group on each of two adjacent carbon atoms.

2. The compound according to claim 1 which is 1-(α-hydroxybenzyl)-3-methyl-1,2,3,4-tetrahydroisoquinoline-2-carbonitrile.

3. The compound according to claim 1 which is 1-(p-chloro-α-hydroxybenzyl)-3-methyl-1,2,3,4-tetrahydroisoquinoline-2-carbonitrile.

4. The compound according to claim 1 which is 1-(3,4-dichloro-α-hydroxybenzyl)-3-methyl-1,2,3,4-tetrahydroisoquinoline-2-carbonitrile.

* * * * *